(12) United States Patent
Higashikawa (10) Patent No.: US 9,357,695 B2
(45) Date of Patent: Jun. 7, 2016

(54) RIDING MOWER

(71) Applicant: KUBOTA CORPORATION, Osaka (JP)

(72) Inventor: Yoshitaka Higashikawa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/640,472

(22) Filed: Mar. 6, 2015

(65) Prior Publication Data

US 2015/0359168 A1 Dec. 17, 2015

(51) Int. Cl.
*A01D 34/00* (2006.01)
*A01D 34/64* (2006.01)
*A01D 34/66* (2006.01)
*A01D 34/82* (2006.01)

(52) U.S. Cl.
CPC .............. *A01D 34/001* (2013.01); *A01D 34/00* (2013.01); *A01D 34/64* (2013.01); *A01D 34/66* (2013.01); *A01D 34/82* (2013.01)

(58) Field of Classification Search
CPC ........ A01D 34/64; A01D 34/00; A01D 34/66
See application file for complete search history.

(56) References Cited

U.S. PATENT DOCUMENTS

| | | | | |
|---|---|---|---|---|
| 3,154,903 A * | 11/1964 | Smith | ..................... | A01D 34/64 56/15.8 |
| 5,390,480 A * | 2/1995 | Simonson | .............. | A01D 34/66 56/13.6 |
| 5,473,871 A * | 12/1995 | Fava | ..................... | A01D 43/063 46/14.7 |
| 6,026,634 A * | 2/2000 | Peter | ...................... | A01D 34/64 180/6.5 |
| 6,497,453 B2 * | 12/2002 | Bates | ..................... | A01D 34/64 280/781 |
| 6,810,648 B2 * | 11/2004 | McClain | ................ | A01D 34/64 56/15.9 |
| 7,059,109 B2 * | 6/2006 | Samejima | .............. | A01D 34/64 56/17.1 |
| 8,888,130 B2 * | 11/2014 | Stark | ...................... | A01D 34/66 280/771 |
| 8,950,167 B2 * | 2/2015 | Moroi | ................... | A01D 34/005 56/320.2 |
| 9,167,741 B2 * | 10/2015 | Stark | ........................ | B62D 3/00 |
| 9,210,839 B2 * | 12/2015 | Schygge | ................ | A01D 34/78 |
| 2005/0284120 A1 | 12/2005 | Tada et al. | | |
| 2015/0007541 A1 * | 1/2015 | Albinger | ................ | A01D 69/02 56/10.2 A |

FOREIGN PATENT DOCUMENTS

EP 2514295 10/2012

* cited by examiner

*Primary Examiner* — Nicole Verley
(74) *Attorney, Agent, or Firm* — Greenblum & Bernstein, P.L.C.

(57) ABSTRACT

A riding mower is provided with a mower assembly supported on a vehicle body frame between front wheels and rear wheels. A steering assembly is configured to be operated by a driver. A driver seat is supported on the vehicle body frame. A floor panel extends from an area including the driver seat toward the front. The floor panel is provided with a main panel located in front of the driver seat, as well as left and right footrests extending further forward from the main panel. A recessed portion is formed on at least one side edge of the floor panel and includes a side edge dropoff point.

20 Claims, 6 Drawing Sheets

RIDING MOWER

CROSS-REFERENCE TO RELATED APPLICATIONS

The present application claims priority under 35 U.S.C. §119 of Japanese Application No. 2014-124277, filed on Jun. 17, 2014, the disclosure of which is expressly incorporated by reference herein in its entirety.

BACKGROUND OF THE INVENTION

1. Field of the Invention

The present invention relates to a riding mower provided with a mower assembly supported on a vehicle body frame between pairs of left and right rear wheels and front wheels; a steering post supporting a steering wheel; a steering post cover covering the steering post; a driver seat located behind the steering wheel along a front-back direction centerline of the vehicle body; and a floor panel extending along the vehicle body frame from a region including the steering post cover to a region including the driver seat.

2. Description of Related Art

The overall length of the vehicle body (front-back direction length) is shortened in this kind of riding mower, and the maneuverability of the riding mower is improved. Operation pedals are arranged in an area where a driver places his or her feet (footrest area); therefore, when the vehicle body is shortened regardless of the need for adequate space, preserving the footrest area tends to be difficult. Therefore, a riding mower proposed in European Patent Publication No. 2514295 increases the width of left and the right footrests of a floor panel (lateral direction of the vehicle) enough to cover approximately half of the front wheels in a plan view, and positions an accelerator pedal and a brake pedal on the footrests. However, with this kind of riding mower, the driver sitting in the driver seat has difficulty seeing a border line between mowed and unbowed areas situated between the front wheels and a mower assembly.

To ensure that a driver sitting in a driver seat can visually verify an area between the front wheels and a mower assembly easily, a riding mower can include a floor panel where a front section of a footrest has a narrower width, as exemplified in United States Patent Publication No. 2005/0284120.

SUMMARY OF THE INVENTION

Based on the foregoing, there is a need for a riding mower of the above type with a structure whereby a driver sitting in a driver seat can visually verify an area between the front wheels and a mower assembly easily.

A riding mower according to one aspect of the present invention includes: a mower assembly supported on a vehicle body frame between pairs of left and right rear wheels and front wheels; a steering assembly configured for operation by a driver; a driver seat supported on the vehicle body frame along a front-back centerline of the vehicle body; and a floor panel provided on the vehicle body frame extending frontward from an area including the driver seat. The floor panel is provided with a main panel located in front of the driver seat; and a left footrest and a right footrest each extending further frontward from the main panel. A recessed portion is formed on at least one side edge of the floor panel, the recessed portion including a side edge dropoff point that in a plan view is the shortest distance to the front-back direction centerline of the vehicle body.

This configuration provides a recessed portion on at least one side edge on either the left or right side of the floor panel laid on a bottom surface of the driver's steering space; this recessed portion is a dent along the front-back direction centerline of the vehicle body. A concavity toward the inside of the floor panel aids the driver sitting in the driver seat in visually verifying the area between the front wheels and the mower assembly. Further, the location at which the recessed portion is formed is preferably in the side edge of the main panel; however, a portion of the recessed portion may extend to an area including the footrest. In either case, forming the recessed portion in the appropriate side edge of the floor panel can aid the driver sitting in the driver seat in visually verifying the area between the front wheels and the mower assembly. Despite that, the recessed portion is preferably formed substantively in the side edge of the main panel to preserve sufficient dimensions for a footrest.

The riding mower according to another aspect of the present invention is configured such that the steering assembly is configured by a steering post that supports a steering wheel in front of the driver seat; and a steering post cover that covers the steering post. The floor panel is provided on the vehicle body frame extending from the area including the driver seat to an area including the steering post cover; the left footrest is provided extending frontward along the left side surface of the steering post cover; and the right footrest is provided extending frontward along the right side surface of the steering post cover. In this manner, when the steering post cover, which covers the steering post, is in front of the driver seat, there is a limit to the surface area that may be reserved for the footrest. Despite that, in the above described aspect, providing the recessed portion in addition to preserving the dimensions for the footrest aids the driver sitting in the driver seat to visually verify the area between the front wheels and the mower assembly.

Moreover, as another aspect of the present invention, on the side edge, a contour from the side edge dropoff point toward the front extends outward to incline at a larger degree than the contour from the side edge dropoff point toward the rear. This means that the width of the main panel from the side edge dropoff point, which is at the innermost concave part of the recessed portion, toward the front widens immediately compared to the width of the floor panel, and especially the main panel, from the side edge dropoff point toward the rear. Thus, it is possible to preserve sufficient dimensions for the footrest and aid the driver in visually verifying the border line between mowed and unbowed areas.

The recessed portion could be made larger to facilitate the driver sitting in the driver seat in seeing the area between the front wheels and the mower assembly; however, when the recessed portion is too large, the bottom surface of the steering space becomes smaller, which reduces maneuverability and the ease of boarding the vehicle. Moreover, the height of the driver's eyes is different for each person. With these points in mind, the inventors discovered through experimental and experiential study that to provide a suitable recessed portion, it is important for an angle formed between a horizontal plane and a straight line connecting a seat center and the side edge dropoff point is from 25° to 45°, where an intersection of a border line between a seat cushion and a seat back of the driver seat and the front-back direction centerline of the vehicle body is taken as the seat center. More specifically, the aforementioned angle is preferably around 30°. Therefore, even when the height of the driver's eyes differs due to the driver's sitting height, satisfying the above described parameters can still provide satisfactory visibility of the area between the front wheels and the mower assembly.

In a commonly-used riding mower, the border line between mowed and unbowed areas is located on one side along a traveling direction of the mower; therefore, the recessed portion may be placed on just one side. However, the driver may have a habit of turning left or turning right based on his or her preferences, or the border line between mowed and unbowed areas may end up on the left side or on the right side during special mowing operations. Therefore, another aspect of the present invention is to form the recessed portion on both side edges of the floor panel, and in particular on the main panel.

Further, while providing a sufficient surface area for the footrest is important to improving the maneuverability and occupant comfort-level of the mower, a footrest that bulges outward increases the likelihood that an obstacle will block the footrest during travel. Thus, in the riding mower according to another aspect of the present invention, the left footrest and the right footrest extend in the front-back direction of the vehicle while keeping any fluctuation in the lateral direction widths thereof to no more than 10%. Namely, in this aspect, the footrests have a substantively constant width, and are rectangular or flat platforms in overall shape.

In the riding mower according to another aspect of the present invention, an outer end of the front left wheel juts further outward than an outer front end of the left footrest; and an outer end of the front right wheel juts further outward than an outer front end of the right footrest. On adopting this feature, the front wheels act as guards while the vehicle is traveling forward, and therefore there is an extremely low probability that the footrests will hit an obstacle directly.

The ability to verify the positioning of the front wheels, and in particular the location of contact between the front wheels and the ground, is important for precise and adequate mowing operations, namely, for maneuvering the mower. Therefore, it is important that the driver be able to easily verify the aforementioned locations. To address this concern, the riding mower according to another aspect of the present invention is configured such that the front ends of the left footrest and the right footrest and the front wheels are arranged with a gap therebetween in a plan view. In this respect, the front end of the left footrest, the left side surface of the steering post cover, and the front left wheel form a quadrangular open space in a plan view; and the front end of the right footrest, the right side surface of the steering post cover, and the front right wheel form a quadrangular open space in a plan view. The presence of the open space allows the driver, while sitting in the driver seat, to verify a location of contact between the front wheels and the ground over substantially the entire width of the front wheels.

Embodiments preserving ample dimensions at the front area of the footrests, in particular, facilitate placing foot-operated equipment on the footrest. Therefore, the riding mower according to another aspect of the present invention may be configured such that a forward speed setting pedal and a reverse speed setting pedal are arranged on the right footrest aligned in the lateral direction of the vehicle body.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
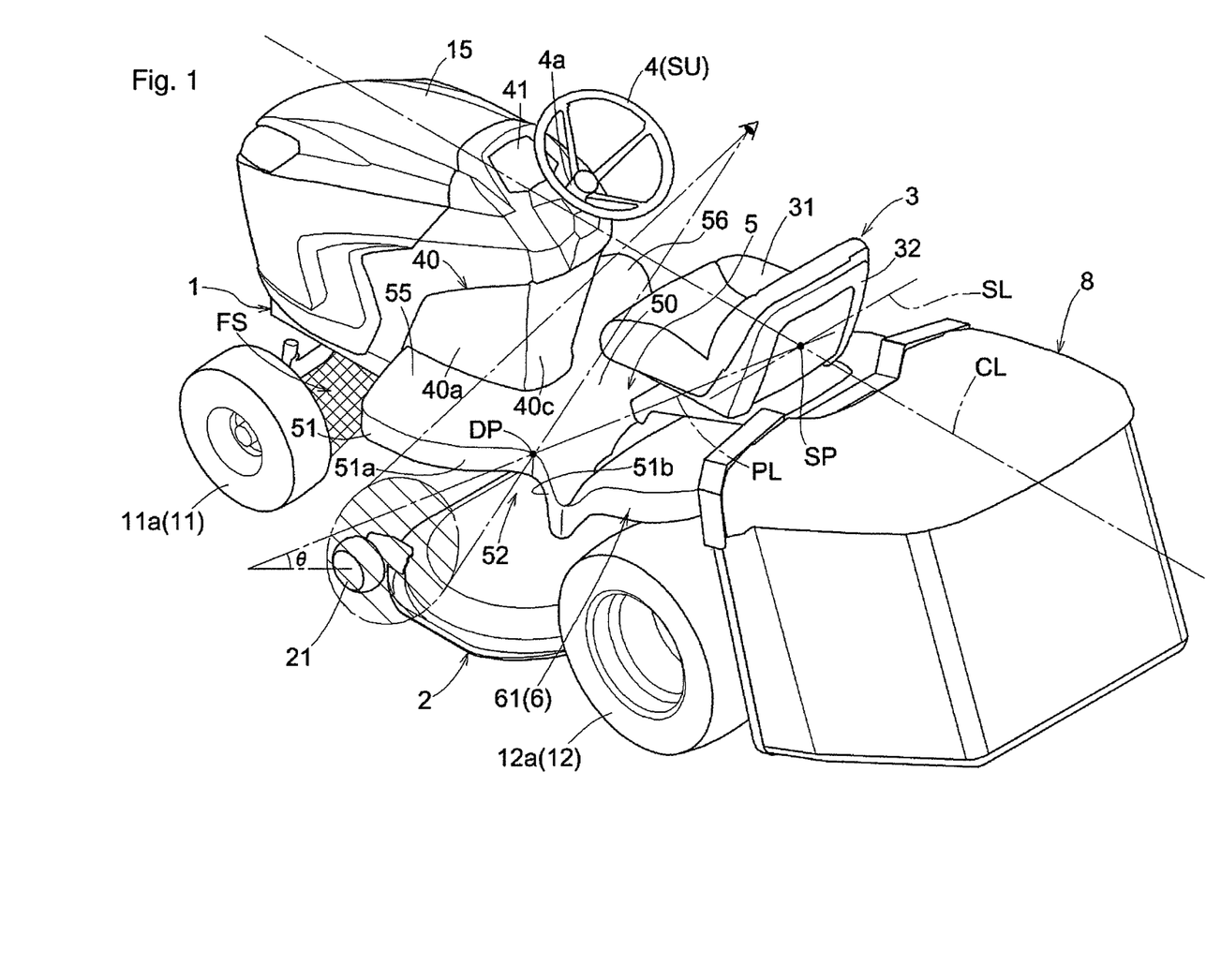
FIG. 1 is an explanatory schematic view illustrating a basic structure of a riding mower according to the present invention.

Before describing a riding mower according to specific embodiments of the present invention, a basic structure of a riding mower having features of the invention is described using FIG. 1. The riding mower exemplified in FIG. 1 is equipped with a vehicle body frame 1 supported on the ground by pairs of left and right front wheels 11 and rear wheels 12. Note, when the left and right front wheels 11 and rear wheels 12 are being differentiated in the present description, the front left wheel and front right wheel are given reference numerals 11a and 11b respectively, and the rear left wheel and rear right wheel are given reference numerals 12a and 12b respectively. A mower assembly 2 is supported on the vehicle body frame 1 suspended between the front wheels 11 and the rear wheels 12. The vehicle body frame 1 extends along a front-back direction centerline CL of the vehicle body from the front section to the rear section of the riding mower. As a rule, in the present description, a front-back direction refers to a longitudinal direction (straight-line travel direction) of the mower; a lateral direction (left-right direction) refers to a transverse direction of the mower (i.e., a direction orthogonal to the longitudinal direction); and a vertical direction refers to a direction perpendicular to the ground (horizontal plane).

An engine is mounted in the front section of the vehicle body frame 1; however, in FIG. 1 the engine is hidden by a hood 15 that covers an engine compartment. An upper part of the rear end of the hood 15 continues into an instrument panel 41, while a lower part of the rear end of the hood 15 continues into a steering post cover 40. The riding mower exemplified in FIG. 1 adopts a steering assembly SU, in which a steering wheel 4 serves as the steering assembly. In a plan view, the steering post cover 40 has a C-shaped cross-section and is provided with a left side surface 40a, a right side surface 40b, and a front surface 40c. The steering wheel 4 is rotatably supported on an upper part of a steering post 4a, the steering post cover 40 hiding a large portion of the steering post 4a. A driver seat 3 is arranged behind the steering wheel 4 on the front-back direction centerline of the vehicle body. A seat cushion 31 and a seat back 32 configure the driver seat 3. A grass collector 8 may be installed on the rear end of the vehicle body frame 1, that is, behind the driver seat 3 and behind the rear wheels 12. FIG. 1 illustrates a state where the grass collector 8 is installed on the riding mower.

A floor panel 5 is laid above the vehicle body frame 1 from a region including the steering post cover 40 to a region including the driver seat 3. The floor panel 5 is provided with a main panel 50, a left footrest 55, and a right footrest 56; however, the floor panel 5 is preferably formed as a single panel. The main panel 50 is a section located between the driver seat 3 and the steering post cover 40 in a plan view. The left footrest 55 is connected to the left front end of the main panel 50, and is a section extending laterally from and along the left side surface 40a of the steering post cover 40. The right footrest 56 is connected to the right front side end of the main panel 50, and is a section extending laterally from and along the right side surface 40b of the steering post cover 40. The floor panel 5 provides a floor surface for the driver in a cockpit space; moreover, side regions on the left and right of the main panel 50 of the floor panel 5 serve as steps the driver can use when getting into the driver seat 3 (later referred to as a boarding step), while a center region of the main panel 50 serves as a cover covering a power transmission mechanism. The power transmission mechanism transmits power from a drive mechanism of the mower assembly 2 or the engine to the rear wheels 12. In addition, the left footrest 55 of the floor panel 5 establishes a place for the driver sitting in the driver seat 3 to place the left foot; thus, the brake pedal 73 can be placed here (refer to FIG. 4). The right footrest 56 provides a place for the driver sitting in the driver seat 3 to place the right foot; thus, a forward speed setting pedal 71 and a reverse speed setting pedal 72 can be placed here, aligned laterally (see FIG. 5). In addition, the left footrest 55 and the right footrest 56 may extend in the front-back direction of the vehicle with almost no change to the lateral direction widths thereof.

To the extent of the above, the main panel 50, the left footrest 55, and the right footrest 56 are preferably widened to the full width of the vehicle defined by the front wheels 11 or the rear wheels 12 since it is advantageous for these sections to each be as wide as possible laterally. In the configuration exemplified in FIG. 1, the left footrest 55 and the right footrest 56 extend in the front-back direction of the vehicle while maintaining almost constant lateral direction widths. Accordingly, although the border line between the steering post cover 40, and the left footrest 55, and the right footrest 56 is curved into an outwardly concave shape, the side edges of the left footrest 55 and right footrest 56 curve to almost the same degree. Moreover, the front ends of the left footrest 55 and right footrest 56 are inclined at a shallow angle of roughly 20°; therefore, a sufficient interval is open between the front ends of the left footrest 55 and right footrest 56 and the corresponding front wheels 11 in a plan view. Additionally, the front ends of the left footrest 55 and right footrest 56 and the side surface of the hood 15 or the steering post cover 40 form an open space that is quadrangular in a plan view. The existence of the quadrangular open space allows the driver sitting in the driver seat 3 to successfully verify the orientation and attitude of the front wheels 11. In addition, to prevent obstacles that pass close beside the front wheels 11 from colliding with the front end of the left footrest 55 or the right footrest 56, the outer end of the front left wheel 11a may be configured to jut further outward than the outward front end of the left footrest 55, and the outer end of the front right wheel 11b may be configured to jut further outward than the outward front end of the right footrest 56.

When the mower assembly 2 is suspended between the front wheels 11 and the rear wheels 12 (a mid-mount riding mower), allowing the driver to visually verify the border line between the mowed and unbowed areas that appears in the space between the front wheels 11 and the front end on either the left or right side of the mower assembly 2 is important for a successful mowing operation. However, when the floor panel 5 overhangs from the vehicle sideways, it tends to be difficult to visually verify that border line.

Therefore, as is clear from FIG. 1, in the present invention, a recessed portion 52 is formed in the left side edge 51 of the main panel 50, the recessed portion 52 including a side edge dropoff point DP that is the shortest distance to the front-back direction centerline CL of the vehicle body in a plan view. Namely, the side edge 51 in the boarding step area of the main panel 50 cuts towards the front-back direction centerline CL of the vehicle body, and the deepest cut location is the side edge dropoff point DP. The recessed portion 52 is formed from a front recessed side edge 51a, and a rear recessed side edge 51b. The front recessed side edge 51a extends forward from the side edge dropoff point DP and connects to the side edge 51 of the left footrest 55; the rear recessed side edge 51b extends rearward from the side edge dropoff point DP and connects to a left rear wheel fender 61 on the side edge 51. The front recessed side edge 51 a curves slightly while extending outward at a larger angle than the rear recessed side edge 51b. That is, the main panel 50 in front of the side edge dropoff point DP secures as large a transverse width as possible while being connected to the left footrest 55. Further, the recessed portion 52 may extend to the area including the left footrest 55 or the right footrest 56.

The existence of the recessed portion 52 facilitates visual inspection of the area between the front wheels 11 and the mower assembly 2 for the driver sitting in the driver seat 3. Therefore, while the deeper the cut the better, providing a deep cut is a trade-off with preserving the dimensions for the boarding step or the footrests. To suitably address this concern, in the present invention the location of the side edge dropoff point DP is established such that an angle formed between a horizontal plane and a straight line PL. Connecting a seat center SP and the side edge dropoff point DP is from 25° to 45°, and preferably between 30° and 35°. Here, the seat center SP is the intersection between a border line SL between the seat cushion 31 and the seat back 32 of the driver seat 3, and the front-back direction centerline CL of the vehicle body, as is clear from FIG. 1. Thus, the driver sitting in the driver seat 3 is still able to verify the area between the front wheels and the mower assembly, even when there are differences in the height of the driver's viewpoint due to the driver's sitting height.

When the border line between mowed and unbowed areas is always located toward one side of the traveling direction during mowing, it is sufficient to simply form the recessed portion 52 on that one side of the main panel 50. However, considering individual preferences, the recessed portion 52 is generally formed on both sides of the main panel 50.

Figure 2:
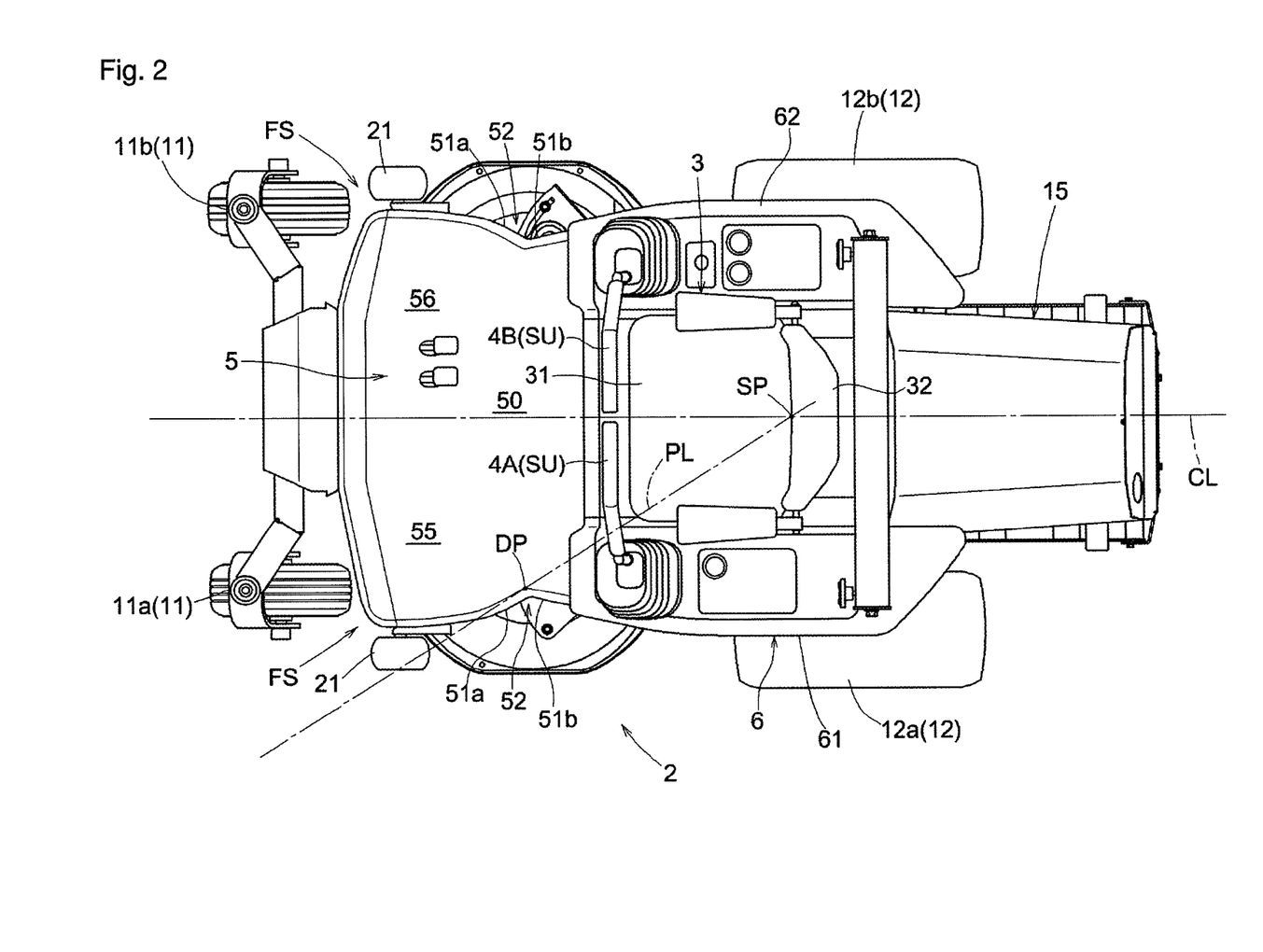
FIG. 2 is an explanatory schematic view illustrating a basic structure of a different type of riding mower.

While the riding mower exemplified in FIG. 1 adopts a configuration using the steering wheel 4 as the steering assembly SU, the present invention may also be adopted in other types of riding mowers. For instance, FIG. 2 illustrates an example of an embodiment of the invention adopted in a riding mower where steering is carried out using a pair of left and right steering levers 4A and 4B, in a so-called zero turn mower. In this type of riding mower, the forward and reverse speeds of the left rear wheel 12a and the right rear wheel 12b are respectively controlled based on operation of a pair of left and right steering levers. Rear wheel fenders 6 and the pair of left and right steering levers 4A and 4B are respectively arranged on the left and right sides of the driver seat 3. Various operation levers or operation buttons and the like are arranged on an upper surface of the rear wheel fenders 6. Engine equipment (not shown) including an engine (not shown) is arranged in an area behind the driver seat 3. The mower assembly 2 is suspended from the vehicle body frame 1 between the pair of left and right front wheels 3a and the pair of left and right rear wheels 3b so as to be lifted and lowered via a lift mechanism (not shown).

A metal sheet is laid as the floor panel 5 in the front region of the vehicle body frame 1 so as to cover almost the entire region from above. The floor panel 5 is provided with the main panel 50 that has a substantially horizontal surface, the left footrest 55, and the right footrest 56. The main panel 50 includes a horizontal surface extending horizontally from in front of the driver seat 3, while the left footrest 55 and right footrest 56 each include an inclined surface that slopes upward toward the front.

Naturally, the riding mower in this embodiment also includes the recessed portion 52 formed in the left side edge 51 of the floor panel 5, the recessed portion 52 including the side edge dropoff point DP that is the shortest distance to the front-back direction centerline CL of the vehicle body in a plan view. Here, the recessed portion 52 reaches to the region including the left footrest 55. The location where the side edge 51 of the main panel 50 cuts deepest is the side edge dropoff point DP in the recessed portion 52. The location and geometric shape of the recessed portion 52 is established so that the driver sitting in the driver seat 3 can verify the area between the front wheels 11 and the mower assembly 2 even when there are differences in the height of the driver's viewpoint resulting from slight differences in the driver's sitting height.

Figure 3:
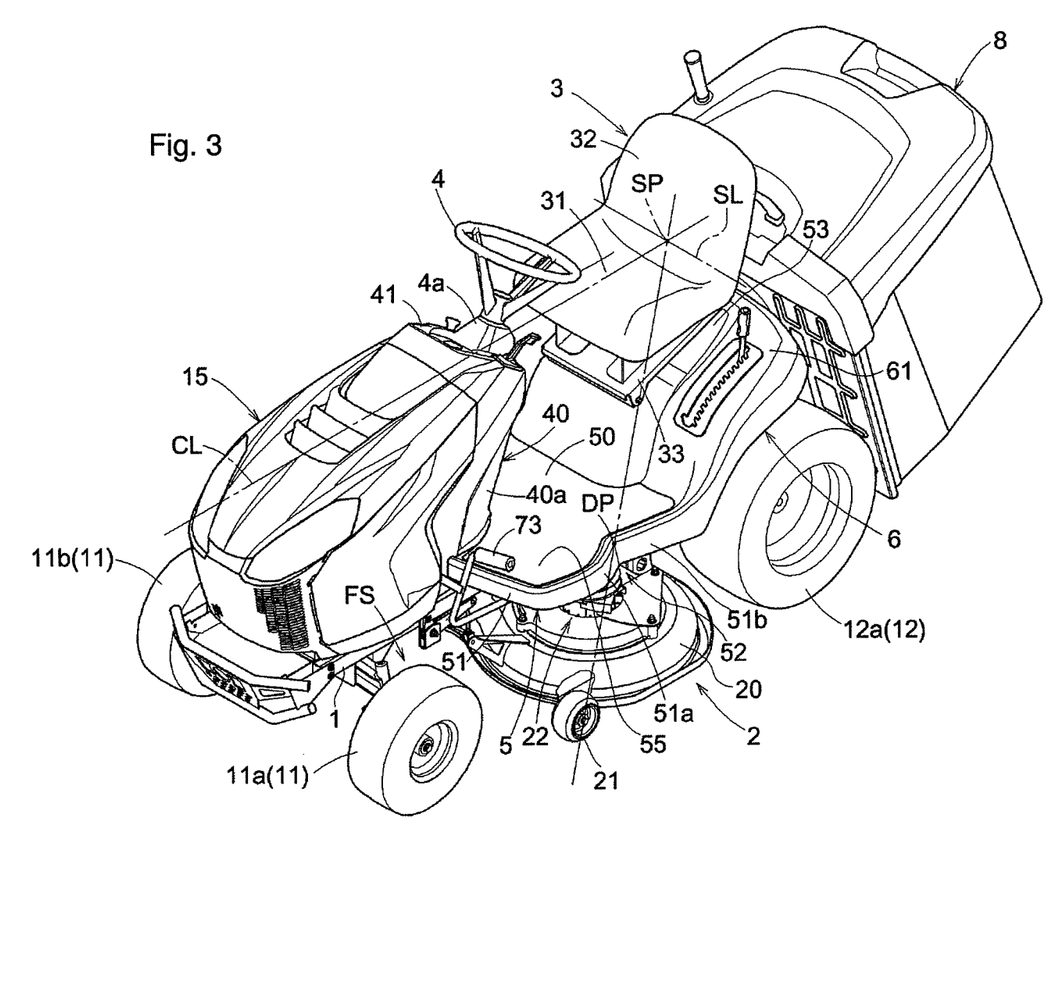
FIG. 3 is a perspective view illustrating a riding mower according to a first embodiment.
Figure 4:
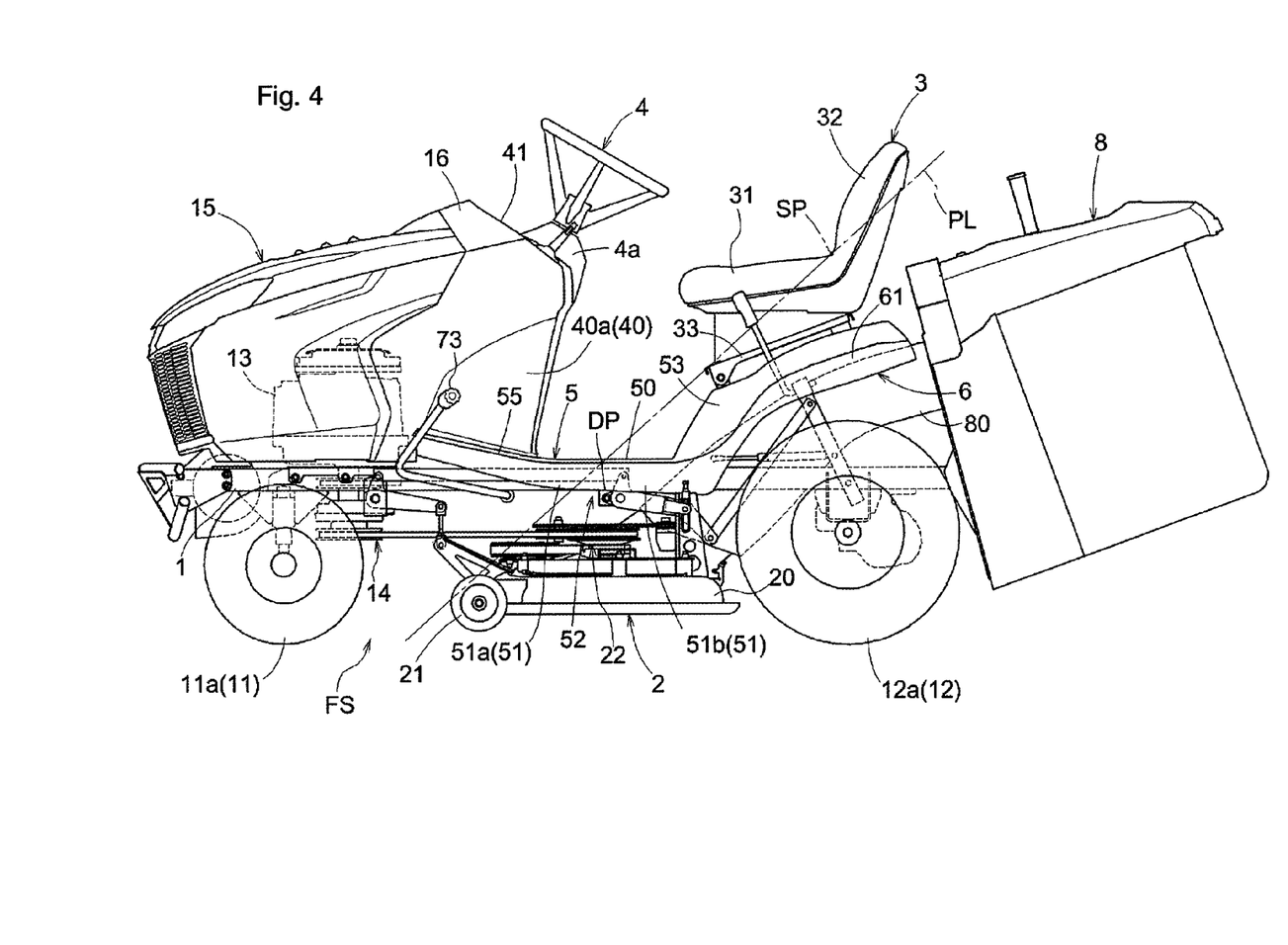
FIG. 4 is a side view of the riding mower illustrated in FIG. 3.
Figure 5:
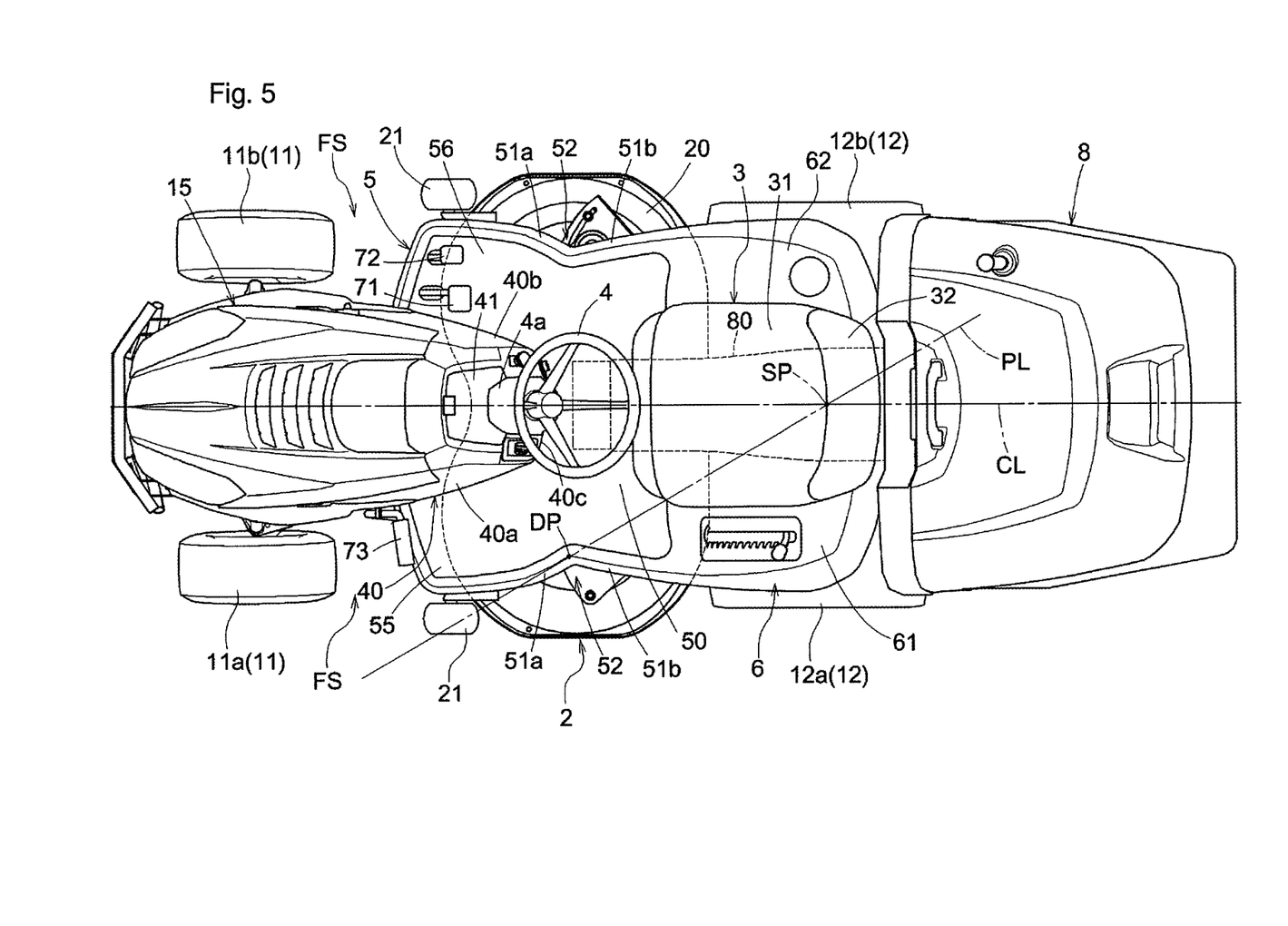
FIG. 5 is a plan or top view of the riding mower illustrated in FIG. 3.

Next, a specific embodiment of a riding mower according to the present invention is described with reference to the drawings. FIG. 3 is a perspective view of the riding mower, FIG. 4 is the side view, and FIG. 5 is the plan view. The riding mower according to this embodiment is provided with the basic features of the floor panel 5, and the recessed portion 52 in particular, described previously using FIG. 1.

As illustrated in FIGS. 3, 4, and 5, the riding mower is equipped with a pair of freely steer able left and right front wheels 11 (front left wheel 11a, front right wheel 11b); a pair of freely derivable left and right rear wheels 12 (rear left wheel 12a, rear right wheel 12b); and the vehicle body frame 1 extending along a front-back direction centerline CL of the vehicle body. The cockpit space including the steering wheel 4 and the driver seat 3 is provided in the rear section of the vehicle body frame 1. The mower assembly 2 is suspended via a lift mechanism (not shown) provided on the vehicle body frame 1 between the front wheels 11 and the rear wheels 12.

An engine 13 (see FIG. 4) is provided in the front section of the vehicle body frame 1; a traveling power transmission mechanism (not shown) extends along the front-back direction centerline CL of the vehicle body transmitting power from the engine 13 to the rear wheels 12. A working power transmission mechanism 14 extends below the vehicle body frame 1 transmitting power from the engine 13 to the mower assembly 2. The working power transmission mechanism 14 receives power from a frontward-oriented output shaft on the engine 13, and transmits the power to a blade drive assembly 22 arranged above a blade housing 20 in the mower assembly 2. The mower assembly 2 in this embodiment is provided with two transversely aligned blades (not shown), which are located inside the blade housing 20 and are rotationally driven by the blade drive assembly 22. Further, ground-contact gauge wheels 21 are provided in the left and right front corner areas of the blade housing 20. The riding mower mows a lawn or grass by rotationally driving the blades (not shown) in the mower assembly 2 as the riding mower travels.

In this embodiment, the grass collector 8 is coupled at the rear of the vehicle body to temporarily store grass cut and taken up by the mower assembly 2. A grass collector duct 80 is arranged between the mower assembly 2 and the grass collector 8. The grass collector duct 80 passes from the mower assembly 2 substantially along the front-back direction centerline CL of the vehicle body above the axle of the rear wheels 12 and extends diagonally upward.

Although not illustrated, the vehicle body frame 1 is configured by a pair of left and right panels that sandwich the front-back direction centerline CL of the vehicle body therebetween and extend in the front-back direction. The rear section of the vehicle body frame 1 is coupled to a speed change device, a rear axle case, and the like configuring the traveling power transmission mechanism (not shown), which increases the rigidity of the vehicle body frame 1.

The engine 13 is mounted in the front section of the vehicle body frame 1, and the hood 15, which covers both side surfaces and the entire surface of the engine 13 and the engine equipment, is also attached to the front section of the vehicle body frame 1. A panel body 16 covers a rear access port in the hood 15. The panel body 16 is configured by the instrument panel 41 and the steering post cover 40. A display panel, and various operation fixtures are arranged on the upper surface of the instrument panel 41, the display panel presenting various operation information such as engine revolutions, vehicle speed, and the like. The steering post cover 40 covers the steering post 4a, and provides an interface for a driver foot space.

The floor panel 5, such as the floor panel illustrated in FIG. 5, is laid on the vehicle body frame 1 from a lower end region of the steering post cover 40 to the area including the driver seat 3. In this embodiment, the floor panel 5 is formed from a single panel, where the left footrest 55, the right footrest 56, the main panel 50, the rear wheel fenders 6 configured by a left rear wheel fender 61 and a right rear wheel fender 62, and a seat base 53 (see FIG. 4) are a single unit.

Figure 6:
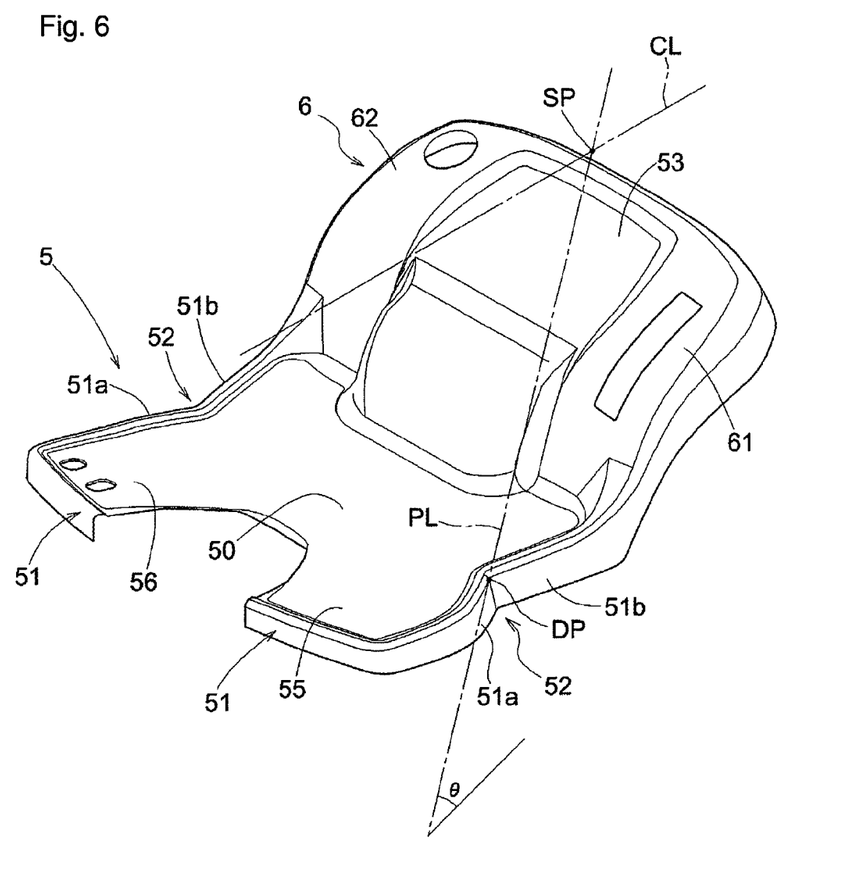
FIG. 6 is a perspective view of a floor panel adopted in the riding mower illustrated in FIG. 3.

As is clear from FIGS. 4 and 6, when the floor panel is installed on the vehicle body frame 1, the main panel 50 lies horizontally, and the left footrest 55 and right footrest 56 are inclined, sloping toward the rear. The left rear wheel fender 61 and the right rear wheel fender 62 rise upward from the main panel 50 at no less than 45°, and then partway through the incline extend sloping back and upward at no more than 45°. The seat base 53 extends to connect the left rear wheel fender 61 and the right rear wheel fender 62, with a seat attachment frame 33 that attaches the driver seat 3 secured in an area including a gradually inclining surface. While not illustrated in detail, various operational equipment may be arranged on the left rear wheel fender 61 and the right rear wheel fender 62 on both sides of the driver seat 3.

The recessed portion 52 is formed on both sides of the main panel 50, the planar geometric shape of which can be well understood from FIG. 5. As described above, forming the recessed portion 52 can improve the visibility of the area between the front wheels and the mower assembly for the driver sitting in the driver seat 3.

The most concave point of the recessed portion 52 is indicated by the side edge dropoff point DP. The floor panel 5 gradually spreads outward from the side edge dropoff point DP until the rear wheel fender 6 in the rear; in particular, the floor panel 5 preserves the dimensions for the portion of the main panel 50 that serves as the boarding step behind the side edge dropoff point DP. The area forward of the side edge dropoff point DP until the left footrest 55 and right footrest 56 spreads outward quickly and then spreads outward gradually after that point. Thus, adequate dimensions required for the left footrest 55 and right footrest 56 in front may thereby be secured. Also, in this embodiment, the left footrest 55 and the right footrest 56 extend so that the lateral direction widths thereof do not fluctuate by any more than 10%; in other words, the left footrest 55 and right footrest 56 can extend in the front-back direction of the vehicle with almost no variation in the widths thereof. A vicinity of the front edges of the left footrest 55 and right footrest 56 extends substantially within the transverse plane of the vehicle (a sweep back angle no greater than 20°).

In this embodiment, the location of the side edge dropoff point DP is established such that an angle θ formed between a horizontal plane and the straight line PL. Connecting the seat center SP and the side edge dropoff point DP is almost 30°. Moreover, the shape of the recessed portion 52 may be defined such that the concave shape of the recessed portion 52 is triangular in a plan or top view, with the side edge dropoff point DP as one of the vertices of the triangle.

Other Non-Limiting Embodiments (1) In the above embodiment, the recessed portion 52 is substantially a triangle with the side edge dropoff point DP as a vertex thereof, and the edges thereof curved in a convex shape toward the center of the recessed portion 52; however, the shape of the recessed portion 52 may be modified in various ways. For instance, the edges may curve in a concave shape toward the center. Alternatively, instead of a triangle-like shape the shape of the recessed portion 52 may be almost a proper triangle, a half-circle, or a quadrangle, or a polygon having still more angles.
(2) In the above embodiments, the riding mower is a front-engine type where the engine 13 is located in the front section of the vehicle body; however, the riding mower may be a rear-engine type where the engine 13 is located in the rear section of the vehicle body. See e.g., FIG. 2.
(3) In the above embodiments, the engine 13, which is an internal combustion engine, is the drive source for the riding mower; however, the drive source for the riding mower may be a battery or an electric motor.
(4) In the above embodiments, the driver uses the steering wheel 4 for maneuvering the riding mower; however, lever type travel operation equipment may be used.

The present invention may be adopted in riding mowers where a mower assembly is arranged below a floor panel. See e.g., FIG. 2.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A riding mower comprising:
a mower assembly supported on a vehicle body frame between pairs of left and right rear wheels and front wheels;
a steering assembly configured for operation by a driver;
a driver seat; and
a floor panel provided on the vehicle body frame and extending frontward from an area that includes the driver seat;
said floor panel comprising:
a main panel section located in front of the driver seat; and
left and right footrest sections each extending further frontward from the main panel section; and
a recessed portion arranged on at least one side edge of the floor panel, the recessed portion including a side edge dropoff point that, in a top view, defines a shortest distance to a an imaginary front-back direction centerline of the vehicle body in comparison to at least one of front and back ends of the at least one side edge of the floor panel.

2. The riding mower according to claim 1, wherein the steering assembly comprises a steering post that supports a steering wheel in front of the driver seat, and a steering post cover that covers the steering post, and
wherein:
a portion of the main panel section extends from the area including the driver seat to an area including the steering post cover,
the left footrest section extends frontward and along a left side of the steering post cover, and
the right footrest section extends frontward and along a right side of the steering post cover.

3. The riding mower according to claim 1, wherein an outer end of the front left wheel juts further outward than an outer front end of the left footrest section, and an outer end of the front right wheel juts further outward than an outer front end of the right footrest section.

4. The riding mower according to claim 1, wherein, in top view, a distance between front ends of the left and the right footrest sections is greater than a distance between outer ends of the front left and right wheels.

5. The riding mower according to claim 4, further comprising a gap arranged between one of the front ends of the left and the right footrest sections and one of the outer ends of the front left and right wheels.

6. The riding mower according to claim 1, wherein at least one of:
a front end of the left footrest section, the left side of a steering post cover, and the front left wheel define an open space which resembles a quadrangular shape in top view, and
a front end of the right footrest section, the right side of the steering post cover, and the front right wheel define an open space which resembles a quadrangular shape in top view.

7. The riding mower according to claim 1, wherein the at least one side edge comprises a contour that widens or inclines outwardly, by a first amount, from the side edge dropoff point toward the front and widens or inclines outwardly, by a second amount, from the side edge dropoff point toward the back, and the first amount is greater than the second amount.

8. The riding mower according to claim 1, further comprising an angle formed between:
   a horizontal ground plane; and
   a straight line connecting a seat center point and a point on the side edge dropoff point,
   wherein said angle is between 25° and 45°,
   wherein the seat center point is defined by an intersection of:
      a border line between a seat cushion and a seat back of the driver seat; and
      \the imaginary front-back direction centerline of the vehicle body.

9. A riding mower comprising:
   a mower assembly supported on a vehicle body frame between pairs of left and right rear wheels and front wheels;
   a steering assembly configured for operation by a driver;
   a driver seat arranged on the vehicle body frame; and
   a floor panel provided on the vehicle body frame extending frontward from an area including the driver seat;
   said floor panel comprising:
      a main panel located in front of the driver seat; and
      at least one footrest extending further frontward from the main panel, and
   a recessed portion arranged on at least one side of the floor panel,
   wherein the recessed portion includes a side edge dropoff point that, in a top view, defines a shortest distance to an imaginary front-back direction centerline of the vehicle body in comparison to at least one of front and back ends of the at least one side of the floor panel.

10. The riding mower according to claim 9, wherein the steering assembly comprises a steering post that supports a steering wheel in front of the driver seat, and a steering post cover that covers the steering post, and
    wherein:
       a portion of the floor panel extends from the area including the driver seat to an area including the steering post cover, and
       the at least one footrest is a left footrest arranged on a left side of the steering post cover.

11. The riding mower according to claim 10, further comprising a right footrest arranged on a right side of the steering post cover.

12. The riding mower according to claim 11, wherein an outer end of the front left wheel juts further outward than an outer front end of the left footrest, and an outer end of the front right wheel juts further outward than an outer front end of the right footrest.

13. The riding mower according to claim 12, wherein a distance between the front ends of the left and right footrests and the outer front ends of the front left and right wheels define a gap when viewed in top view.

14. The riding mower according to claim 11, wherein:
    the front end of the left footrest, the left side of the steering post cover, and the front left wheel define a space in top view which resembles a quadrangular shape in top view; and
    the front end of the right footrest section, the right side of the steering post cover, and the front right wheel define a space which resembles a quadrangular shape in top view.

15. The riding mower according to claim 9, wherein the at least one side comprises a contour that widens or inclines outwardly, by a first amount, from the side edge dropoff point toward the front and widens or inclines outwardly, by a second amount, from the side edge dropoff point toward the back, and the first amount is greater than the second amount.

16. The riding mower according to claim 9, further comprising an angle formed between:
    a horizontal ground plane; and
    a straight line connecting a seat center point and a point on the side edge dropoff point,
    wherein said angle is between 25° and 45°,
    wherein the seat center point is defined by an intersection of:
       a border line between a seat cushion and a seat back of the driver seat; and
       \the imaginary front-back direction centerline of the vehicle body.

17. A riding mower comprising:
    a mower assembly supported on a vehicle body frame between pairs of left and right rear wheels and front wheels;
    a steering assembly;
    a driver seat; and
    a floor panel arranged on the vehicle body frame and comprising:
       left and right sections defining rear fenders;
       a main panel section located in front of the driver seat; and
       left and right footrest sections which incline upwards; and
       at least one of:
          a left side recessed portion that aids driver visibility of a left side of the mower assembly when a driver is seated on the driver seat; and
          a right side recessed portion that aids driver visibility of a right side of the mower assembly when a driver is seated on the driver seat.

18. The riding mower according to claim 17, wherein the floor panel is a one piece member and comprises both the left side recessed portion and the right side recessed portion.

19. The riding mower according to claim 17, wherein the left footrest section is arranged in front of the left side recessed portion.

20. The riding mower according to claim 17, wherein the right footrest section is arranged in front of the right side recessed portion.

* * * * *